US012717209B2

(12) United States Patent
Moses et al.

(10) Patent No.: US 12,717,209 B2
(45) Date of Patent: Aug. 25, 2026

(54) THIRD-HARMONIC FREQUENCY GENERATOR AND GENERATION METHOD

(71) Applicant: Cornell University, Ithaca, NY (US)

(72) Inventors: Jeffrey A. Moses, Ithaca, NY (US); Noah Flemens, Ithaca, NY (US); Nuno Vinicius, Richardson, TX (US)

(73) Assignee: Cornell University, Ithaca, NY (US)

( * ) Notice: Subject to any disclaimer, the term of this patent is extended or adjusted under 35 U.S.C. 154(b) by 243 days.

(21) Appl. No.: 18/427,721

(22) Filed: Jan. 30, 2024

(65) Prior Publication Data

US 2024/0255829 A1 Aug. 1, 2024

Related U.S. Application Data

(60) Provisional application No. 63/442,413, filed on Jan. 31, 2023.

(51) Int. Cl.

| | |
|---|---|
| ***G02F 1/35*** | (2006.01) |
| ***G02F 1/355*** | (2006.01) |
| ***G02F 1/377*** | (2006.01) |
| ***H01S 3/00*** | (2006.01) |
| *G02F 1/37* | (2006.01) |

(52) U.S. Cl.

CPC ............ *G02F 1/354* (2021.01); *G02F 1/3544* (2013.01); *G02F 1/3548* (2021.01); *G02F 1/3553* (2013.01); *G02F 1/3558* (2013.01); *G02F 1/3775* (2013.01); *H01S 3/0092* (2013.01); *G02F 1/37* (2013.01)

(58) Field of Classification Search

CPC ...... G02F 1/354; G02F 1/3544; G02F 1/3548; G02F 1/3553; G02F 1/3558; G02F 1/37; G02F 1/3775; H01S 3/0092

See application file for complete search history.

(56) References Cited

U.S. PATENT DOCUMENTS 7,463,657 B2 * 12/2008 Spinelli .................. H01S 3/109 372/21
8,373,924 B2 * 2/2013 Starodoumov ........... G02F 1/39 359/328

(Continued)

FOREIGN PATENT DOCUMENTS

WO WO 2022/208085 A1 10/2022

OTHER PUBLICATIONS

Vernay et al. "High efficiency cascaded third-harmonic generation in a quasi-periodically poled ktiopo4 crystal," OSA Continuum vol. 3, No. 6, Jun. 15, 2020, pp. 1536-1544.

(Continued)

*Primary Examiner* — Daniel Petkovsek
(74) *Attorney, Agent, or Firm* — Cozen O'Connor

(57) ABSTRACT

A third-harmonic generation method includes frequency-quadrupling a fundamental optical beam via cascaded second-harmonic generation to yield a fourth-harmonic optical beam. The method also includes down-converting the fourth-harmonic optical beam to yield a third-harmonic optical beam. A third harmonic generator includes a monolithic optical element having nonzero quadratic electric susceptibility to (i) frequency-quadruple a fundamental optical beam via cascaded second-harmonic generation, and (ii) down-convert a fourth-harmonic optical beam to yield a third-harmonic optical beam.

20 Claims, 6 Drawing Sheets

(56) References Cited

U.S. PATENT DOCUMENTS

| | | | | |
|---|---|---|---|---|
| 8,929,406 | B2 * | 1/2015 | Chuang | G02F 1/3534 372/5 |
| 9,841,654 | B2 | 12/2017 | Swanbeck et al. | |
| 10,054,839 | B1 | 8/2018 | Brener et al. | |
| 11,347,130 | B2 | 5/2022 | Maker et al. | |
| 11,394,169 | B2 | 7/2022 | Shu | |
| 11,469,567 | B2 | 10/2022 | Fejer et al. | |
| 11,487,185 | B2 | 11/2022 | Suchowski et al. | |
| 11,557,872 | B2 | 1/2023 | Shaw et al. | |
| 11,719,993 | B2 | 8/2023 | Gapontsev et al. | |
| 11,796,889 | B2 | 10/2023 | Reiser | |
| 2013/0313440 | A1 * | 11/2013 | Chuang | G01N 21/956 372/6 |
| 2015/0338719 | A1 * | 11/2015 | Meundel | G02F 1/353 359/328 |
| 2023/0120953 | A1 | 4/2023 | Hessenius et al. | |

OTHER PUBLICATIONS

Qin, "Theoretical investigations of efficient cascaded third-harmonic generation in quasi-phase-matched and -mismatched configurations," Journal of Optical Society America B, vol. 20, No. 1, Jan. 2003, pp. 73-82.

Flemens et al., "Efficient parametric amplification via simultaneous second harmonic generation," Optics Express, vol. 29, No. 19, Sep. 13, 2021, pp. 30590-30609.

Craxton "High efficiency frequency tripling schemes for high-power nd: Glass lasers," IEEE Journal of IEEE Quantum Electronics vol. 17, No. 9, Sep. 1981, pp. 1771-1782.

Eimerl et al., "Multicrystal designs for efficient third-harmonic generation," Optics Letters, vol. 22, No. 16, Aug. 15, 1997, pp. 1208-1210.

Squier et al., "Third harmonic generation microscopy," Optics Express vol. 3, No. 9, Oct. 26, 1998, pp. 315-324.

Seka et al., "Demonstration of high efficiency third harmonic conversion of high power nd-glass laser radiation," Optics Communications vol. 34, No. 3, Sep. 1980, pp. 469-473.

Qi et al. "Cascaded third-harmonic generation with one KDP crystal," Optics Letters vol. 41, No. 24, Dec. 15, 2016, pp. 5823-5826.

Ivanov et al., "Cascaded fourth-harmonic generation in a single nonlinear crystal," Journal of Optical Society of America B vol. 22, No. 8, Aug. 2005, pp. 1691-1698.

Norton et al. "Aperiodic 1-dimensional structures for quasi-phase matching," Optics Express vol. 12, No. 5, Mar. 8, 2004, pp. 841-846.

Sjaardema et al., "Low-Harmonic Generation in Cascaded Thin-Film Lithium Niobate Waveguides," Advanced Photonics Research, vol. 3, 2022, 8 pages.

Sabirov et al., "Efficient Third-Harmonic Generation by Inhomogeneous Quasi-Phase-Matching in Quadratic Crystals," Photonics, vol. 10, No. 76, 2023, 8 pages.

APE Angewandte Physik & Elektronik GmbH, "The All New HarmoniXX Series Wavelength Conversion for Ultrafast Lasers," Nov. 2017, 12 pages.

Liu et al., "Third- and Second-Harmonic Generation in All-Dielectric Nanostructures: A Mini Review," Frontiers in Nanaotechnology, vol. 4, Article 891892, May 20, 2022, 18 pages.

Lu et al., "Second and cascaded harmonic generation of pulsed laser in a lithium niobate on insulator ridge waveguide," Optics Express, vol. 30, No. 2, Jan. 17, 2022, pp. 1381-1387.

U.S. Appl. No. 62/965,393, filed Jan. 24, 2020, 35 pages.

* cited by examiner

THIRD-HARMONIC FREQUENCY GENERATOR AND GENERATION METHOD

CROSS-REFERENCE TO RELATED APPLICATIONS

This application claims the benefit of U.S. Provisional Application No. 63/442,413, filed on 31 Jan. 2023, the disclosure of which is incorporated herein by reference in its entirety.

GOVERNMENT RIGHTS

This invention was made with government support under Grant Numbers DMR-1719875 and ECCS-1944653 awarded by the National Science Foundation. The government has certain rights in the invention.

BACKGROUND

Third-harmonic generation (THG) is one of the most ubiquitous nonlinear wave-mixing processes for extending the frequency range of high-powered, ultra-fast lasers. Common THG methods are limited by low efficiencies resulting in part by the method's inherent ceiling on the conversion efficiency, which is dependent on material parameters, and its non-convergent, oscillatory dynamics, which ensures spatio-temporally non-uniform pulses aren't fully converted. As a result, conversion efficiencies are modest, even when the device is optimized for highly-efficient THG.

SUMMARY OF THE EMBODIMENTS

Embodiments disclosed herein demonstrate an unconventional method of THG where the fundamental wave is first frequency-quadrupled through cascaded SHG before being down-converted to the third harmonic. When the three associated phase matching conditions are met simultaneously, we find that energy is transferred robustly and efficiently from the fundamental wave to the third harmonic with inhibited back-conversion. Using a spatio-temporal numerical investigation, we find that 100-ps $CO_2$ laser pulses with Gaussian spatio-temporal profiles and a 10-μm wavelength can be converted to their third harmonic with over 80% conversion efficiency in a realizable monolithic orientation-patterned GaAs device.

In a first aspect, a third-harmonic generation method is disclosed. The method includes frequency-quadrupling a fundamental optical beam via cascaded second-harmonic generation to yield a fourth-harmonic optical beam. The method also includes down-converting the fourth-harmonic optical beam to yield a third-harmonic optical beam.

In a second aspect, a third-harmonic generator is disclosed. The third-harmonic generator includes a monolithic optical element having nonzero quadratic electric susceptibility to (i) frequency-quadruple a fundamental optical beam via cascaded second-harmonic generation, and (ii) down-convert a fourth-harmonic optical beam to yield a third-harmonic optical beam.

DETAILED DESCRIPTION OF THE EMBODIMENTS

1. Third-Harmonic Generation

Figure 2:
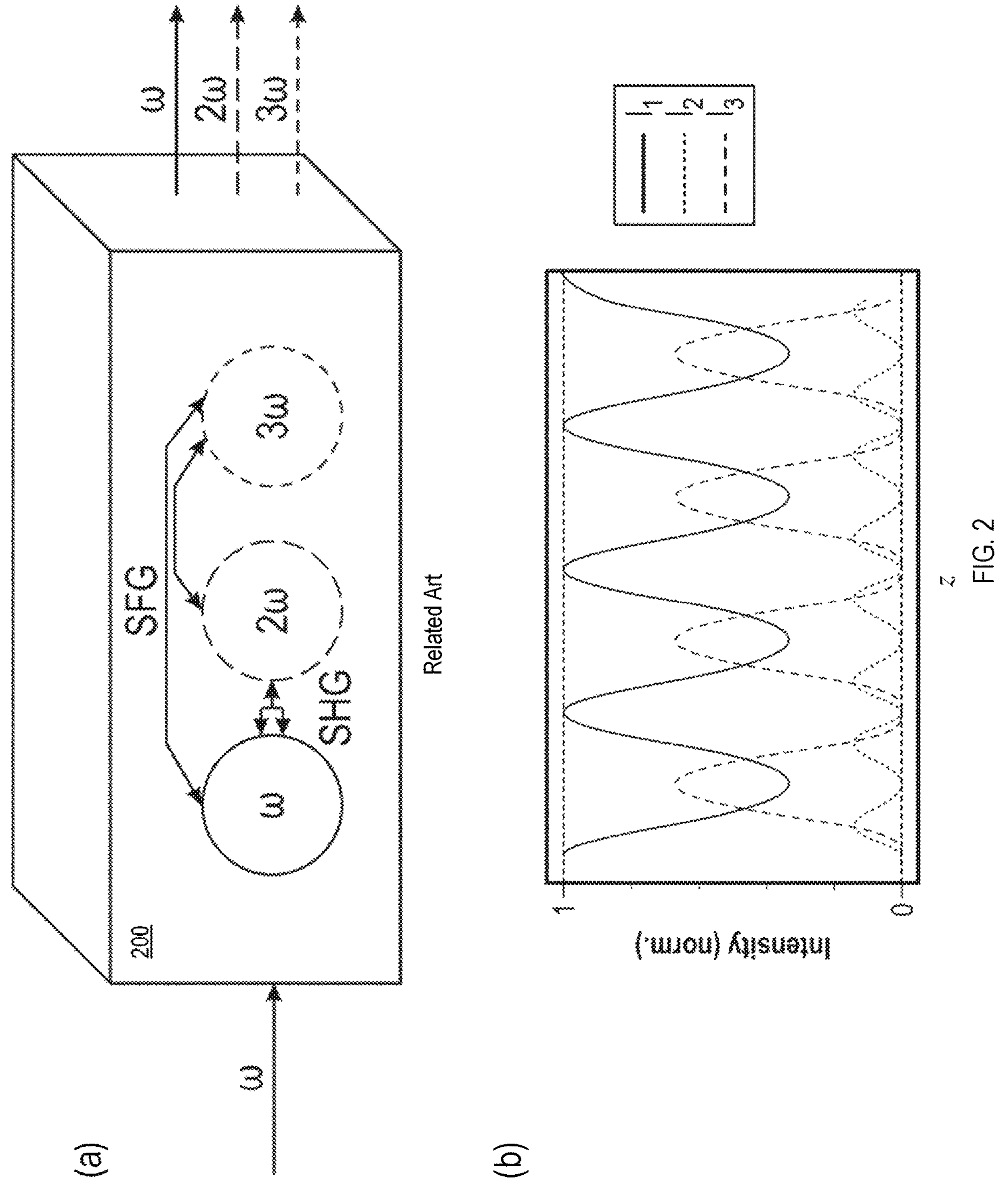
FIG. 2 is a schematic of third-harmonic generation via simultaneous second-harmonic generation and sum-frequency generation.

Third-harmonic generation (THG) is a commonly used nonlinear wave-mixing process for extending the frequency range of high-powered, ultra-fast lasers. The two prominent methods of THG using $\chi^{(2)}$ processes involve sum-frequency generation (SFG) and second-harmonic generation (SHG). The simultaneous method is challenging. With few exceptions, simultaneous processes result in cyclic conversion dynamics, which ensures spatio-temporally non-uniform pulses cannot be fully converted (FIG. 2). Moreover, the peak THG conversion efficiency obtained during a cycle is usually less than one. As a result, conversion efficiencies are modest, even when the device is optimized.

Figure 1:
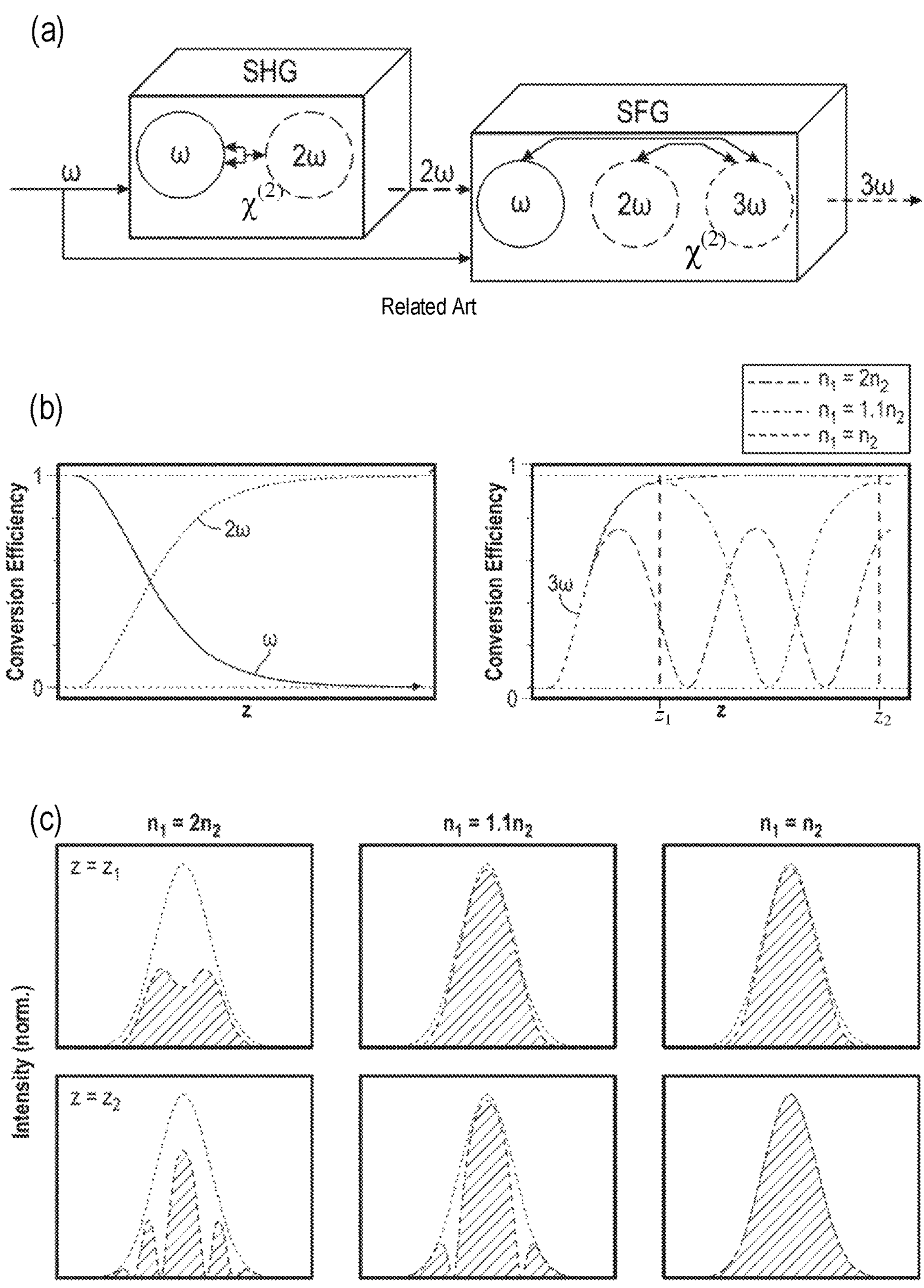
FIG. 1 is a schematic of two-stage third-harmonic generation and associated conversion efficiencies and intensities.

Thus, sequential processes using multiple non-linear media are typically employed when high THG efficiency is required. In addition to being relatively cumbersome compared to a monolithic device, achieving a high conversion efficiency in this case relies on having initial conditions in the SFG stage of equal second-harmonic and fundamental photon numbers (FIG. 1). With this condition met, 80% efficiency has been achieved with large beams and pulse durations ≥100 ps, an important technology for inertial confinement fusion research facilities.

Figure 3:
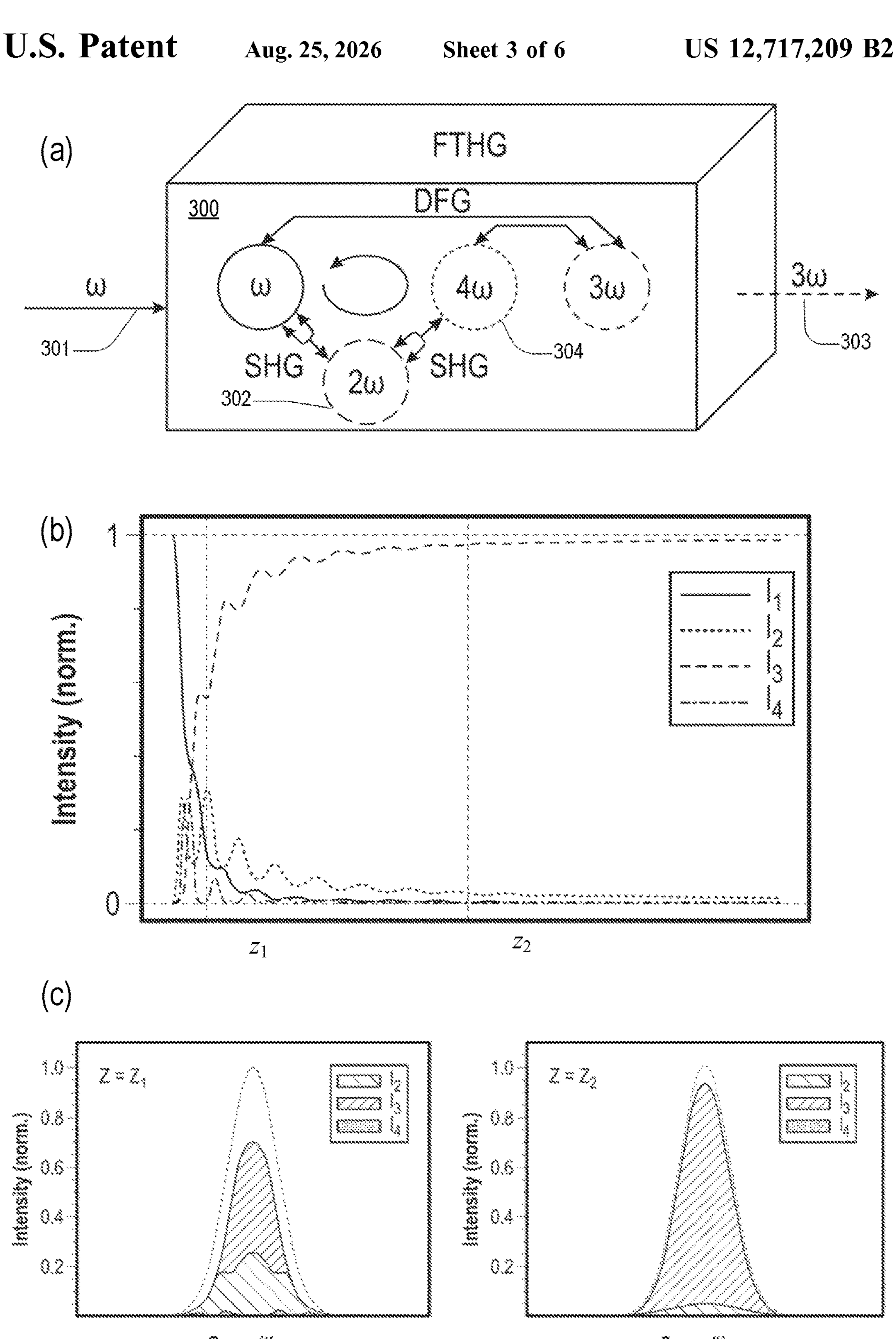
FIG. 3 is a schematic of a third-harmonic generator (THG) that exhibits a fourth-to-third-harmonic generation (FTHG) process, in an embodiment.

Here we disclose a method for THG using hybridized nonlinear optics, which have the convenience of being monolithic while allowing very high conversion efficiency due to its having convergent rather than cyclic evolution dynamics. This process involves cascaded SHG to quadruple the fundamental frequency, and subsequent down-conversion to the third-harmonic through difference-frequency generation (DFG), a process we call fourth-to-third-harmonic generation (FTHG) (FIG. 3).

Using numerical solutions of the coupled amplitude equations, we illustrate the dynamics of this method when all processes are phase matched. We describe three embodiments of FTHG with relevance to common lasers having frequencies in the mid-IR range: 2.06-μm fundamental wavelength in quasi-periodically poled lithium niobate and KTP, and 10-μm fundamental wavelength in orientation-patterned GaAs. We find that these realistic structures robustly produce third-harmonic intensities with upwards of 80% efficiency. In all cases, spatio-temporally Gaussian fundamental wave intensity profiles are assumed.

2. THG in $\chi^{(2)}$ Nonlinear Media

2.1 Two-Stage THG

As discussed above, a common configuration for achieving high THG conversion efficiency requires the use of two separate nonlinear stages. Under this configuration, the input field at the fundamental harmonic is split between the two stages. The first stage performs SHG to double a portion of the fundamental field to its second harmonic. The second stage performs SFG of the remaining fundamental field with the second harmonic field from the previous stage to generate the third harmonic field. This is illustrated in FIG. 1(*a*).

FIG. 1(*a*) is a schematic diagram of a conventional two-stage THG setup. FIG. 1(*b*) shows monochromatic plane wave dynamics for the SHG stage. Full, non-cyclic intensity conversion from the fundamental harmonic to the second harmonic is observed. FIG. 1(*c*) shows monochromatic plane wave dynamics for the SFG stage. The third harmonic intensity is depicted under different initial values of the fundamental and second harmonic flux densities given by $n_1$ and $n_2$, respectively. Non-cyclic and asymptotically full conversion efficiency to the third harmonic occurs only when $n_1=n_2$. FIG. 1(*d*) through FIG. 1(*f*) show spatiotemporal conversion to the third harmonic at the dashed lines in FIG. 1(*c*) corresponding to $z=z_1$ and $z=z_2$ for initial flux densities $2n_1=n_2$, $1.1n_1=n_2$, and $n_1=n_2$, respectively. All simulations assume conditions of perfect phase matching.

In practice, the SHG process tends to be very efficient with full asymptotic conversion possible for monochromatic plane waves when perfectly phase matched (FIG. 1(*b*)). A potential bottleneck in efficiency comes from the SFG process. Two limitations on SFG efficiency arise when the input photon flux densities, $n_1$ and $n_2$, of the fundamental and second harmonic respectively, are unequal. First, one of the lower harmonics will deplete before the other, effectively capping the maximum conversion efficiency achievable (as seen in the two dashed curves of FIG. 1(*c*)). Second, the SFG dynamics will oscillate, resulting in asynchronous conversion along the spatiotemporal distribution of the mixing harmonics. FIGS. 1(*d*) and 1(*e*) illustrate both the cap on maximum THG conversion efficiency and the consequence of asynchronous conversion: no device length can be chosen at which all spatiotemporal coordinates are maximally converted.

These limitations on efficiency may be mitigated by choosing $n_1$ and $n_2$ to be equivalent. As seen in FIGS. 1(*c*), and 1(*f*), this results in full asymptotic conversion to the third harmonic field across the entire spatiotemporal distribution. If the SHG stage is operated with unity efficiency, this amounts to splitting the fundamental in a 2:1 ratio between the first and second stage and then ensuring identical pulse duration and beam shape between the first and second harmonic inputs to the second stage.

2.2 Simultaneous (Single-Stage) THG

An alternative to using two separate nonlinear stages is to perform both nonlinear interactions simultaneously in a single device (FIG. 2(*a*)). Simultaneous THG can be achieved using one of a number of multi-process QPM techniques that allow for simultaneous phase matching of the SHG and SFG processes. This makes for a simple and compact implementation of THG. However, as SFG begins as soon as any second harmonic photons are generated, the initial fundamental and second harmonic field photon flux densities cannot be equal. This leads to the same limitations in THG efficiency due to inhibited and oscillatory dynamics driven by a "mismatch" in the photon flux densities described in the previous section (FIG. 2(*b*))

FIG. 2(*a*) is a schematic diagram of an optical element 200, which functions as 'simultaneous THG' stage, in which SHG and SFG processes are simultaneously phase matched. FIG. 2(*b*) illustrates representative monochromatic plane-wave dynamics of optical element 200. The lack of control over the relative photon flux densities of the mixing harmonics leads to oscillatory evolution and a reduced maximum conversion efficiency.

2.3 Fourth-to-Third-Harmonic Generation

Here, we disclose a novel route toward achieving efficient THG in a single nonlinear stage. Our approach, illustrated in FIG. 3(*a*), involves converting a fundamental harmonic field to its third harmonic by three simultaneously occurring nonlinear processes. The first two nonlinear processes serve to convert the fundamental harmonic to its fourth harmonic through two cascaded SHG processes. The third and final process performs difference frequency generation (DFG) on the fourth harmonic to generate the third harmonic and replenish the fundamental harmonic. The energy in the fundamental harmonic is then re-upconverted to the fourth harmonic, restarting the cycle and resulting in full asymptotic conversion to the third harmonic (FIG. 3(*b*)).

We find under this configuration that the THG process takes on the same damped-cyclic behavior observed for parametric amplification hybridized with SHG, leading to asymptotically full conversion. As these convergent dynamics are independent of the initial intensity, asymptotically full THG conversion dynamics occur across all spatiotemporal coordinates (FIG. 3(*c*)). Thus, as long as the phase matching conditions for each of the three nonlinear processes can be simultaneously met, efficient THG under the FTHG approach becomes as simple as aligning a laser beam into a single device. We consider cascaded SHG to the fourth, along with simultaneous DFG from the 4ω−ω=3ω process. We illustrate these interactions in FIG. 3(*a*). Equation (1) is a coupled-wave equation for this scheme.

$$\begin{cases} \frac{\partial A_1}{\partial z} = i\kappa_1\left(A_2^* A_1 e^{i\Delta k_{211} z} + A_4^* A_3 e^{i\Delta k_{431} z}\right) \\ \frac{\partial A_2}{\partial z} = i\kappa_2\left(\frac{1}{2} A_1^2 e^{-i\Delta k_{211} z} + A_4^* A_2 e^{i\Delta k_{422} z}\right) \\ \frac{\partial A_3}{\partial z} = i\kappa_3\left(A_4^* A_1 e^{i\Delta k_{431} z}\right) \\ \frac{\partial A_4}{\partial z} = i\kappa_4\left(\frac{1}{2} A_2^2 e^{-i\Delta k_{422} z} + A_3 A_1 e^{-i\Delta k_{431} z}\right) \end{cases} \tag{1}$$

As a shorthand, we define $\Delta k_{ijr} \equiv k_i - k_j - k_r$, where k is the wavenumber in the non-linear medium. For example, $\Delta k_{211} = k_2 - 2k_1$, the conventional SHG interaction. Wavenumber $k_i$ depends on the refractive index of the medium at the wavelength of the harmonic and propagation direction of the harmonic having amplitude $A_i$. The coefficients of coupling between harmonic amplitudes are $$\kappa_i = k_i \chi^{(2)} / n_i^2,$$

where $n_i$ is the refractive index of the medium at angular frequency $\omega_i$. The propagation direction is with respect to the non-linear medium's optic axis. We non-dimensionalize this set of equations for further analysis, along with considering the case of perfect phase-matching, eq. (2).

$$\begin{cases} \frac{\partial U_1}{\partial z} = i(2\Gamma_{211} U_2 U_1^* + \Gamma_{431} E_4 E_3^*) \\ \frac{\partial U_2}{\partial z} = i(\Gamma_{211} U_1^2 + 2\Gamma_{422} U_4 U_2^*) \\ \frac{\partial U_3}{\partial z} = i(\Gamma_{431} U_4 U_1^*) \\ \frac{\partial U_4}{\partial z} = i(\Gamma_{422} U_2^2 + \Gamma_{431} U_3 U_1) \end{cases} \quad (2)$$

Here, $|U_k|^2=\eta_k$ is the fractional photon number of the given amplitude. The above coupling coefficients $\Gamma$ dominate the functional dynamics of the interaction, and are defined in the appendix.

FIG. 3(*a*) is schematic diagram illustrating FTHG in a third-harmonic generator (THG) 300. THG 300 frequency-quadruples a fundamental optical beam 301 via cascaded second-harmonic generation to yield a fourth-harmonic optical beam 304. A first second-harmonic generation process of cascaded second-harmonic generation generates a second-harmonic optical beam 302. THG 300 down-converts fourth-harmonic optical beam 304 to yield a third-harmonic optical beam 303. A center wavelength of fundamental optical beam 301 may be between 0.2 micrometers and one micrometer, between one micrometer and fifty micrometers, or within any subrange of either of the aforementioned ranges.

THG 300 may be or include a single monolithic optical element and may have a nonzero quadratic electric susceptibility $\chi^{(2)}$. A material composition of THG 300 may include one of potassium titanyl phosphate (KTP), gallium arsenide, and lithium niobate. For example, THG 300 may be a bulk crystalline device of millimeter-scale thickness or include a sub-micron-scale layer of thin-film lithium niobate, in which case THG 300 may also include a substrate on which the thin film lithium niobate is disposed. THG 300 may be a waveguide, such as a nanophotonic waveguide and/or a ridge waveguide.

The waveguide may include a substrate and a film disposed on at least part of the substrate to confine the optical beams and achieve two or more nonlinear frequency conversion processes on and/or in the film. The substrate (e.g. a $SiO_2$ substrate) may be a transparent biaxial crystal having a refractive index lower than the refractive index of the film at the wavelengths of the optical beams involved and optionally the substrate has at least one dimension in a range of 1 mm-1000 mm, including any value therewithin and any subranges therebetween. The two or more nonlinear frequency conversion processes include: (i) frequency-quadrupling a fundamental optical beam via cascaded second-harmonic generation, and (ii) down-converting a fourth-harmonic optical beam to yield a third-harmonic optical beam. The film may have a thickness of at least 100 nm, or be in a range of 100 nm-2000 nm, including any value therewithin and any subranges therebetween. The film may include a nonlinear optical medium for frequency conversion, such as potassium titanyl phosphate (KTP), gallium arsenide, lithium niobate, Or any combinations thereof. THG 300 may be aperiodically poled, quasi-periodically poled, or periodically poled. THG 300 may be poled via orientation-patterning or ferroelectric domain poling.

THG 300 achieves THG by three simultaneously phase-matched processes: $\omega+\omega\rightarrow 2\omega$(SHG), $2\omega+2\omega\rightarrow 4\omega$(SHG), and $4\omega-\omega\rightarrow 3\omega$ (DFG). FIG. 3(*b*) illustrates that the dynamics of FTHG in THG 300 are rapidly damped cycles, with asymptotically full conversion to the third harmonic field. FIG. 3(*c*) shows asymptotic convergence as propagation in THG 300 approaches infinity, which allows spatiotemporally uniform conversion to the third harmonic and thus high THG efficiency, as illustrated by spatiotemporal intensity plots corresponding to $z=z_1$ and $z=z_2$ in FIG. 3(*b*).

One can specifically compare the third-harmonic amplitude to a duffing oscillator, as shown in eq. (3).

$$\frac{d^2 U_3}{d\Lambda^2} = -(1 - 2\eta_2 - 5\eta_4)U_3 - i\left(\frac{2U_2^*}{\Gamma_0} + \frac{\Gamma_1}{\Gamma_0}\frac{U_2^2}{U_4}\right)U_3' - 3U_3^3 \quad (3)$$

Where the characteristic duffing equations are:

$$\frac{d^2 x}{dt^2} = -kx - \gamma\frac{dx}{dt} + \beta x^3$$

with the equivalent substitutions, $$\begin{cases} x = U_3 \\ t = \Lambda = \zeta\Gamma_0^2 \\ k = 1 - 2\eta_2 - 5\eta_4 \\ \gamma = i\left(\frac{2U_2^*}{\Gamma_0} + \frac{\Gamma_1}{\Gamma_0}\frac{U_2^2}{U_4}\right), \\ \beta = 3 \end{cases}$$

where $\Gamma_0=\Gamma_{431}/\Gamma_{211}$, $\Gamma_1=\Gamma_{422}/\Gamma_{211}$. We perform this derivation in the appendix. In particular, while the direction of this process is hard to gauge analytically, this process appears to converge as $z\rightarrow\infty$ for the third-harmonic.

A consequence of eq. (3) is that THG 300 allows high efficiency third-harmonic generation and insensitivity to the intensity of the input optical wave, whereas devices with undamped oscillatory conversion dynamics do not. Conventional monolithic devices tend to achieve undamped oscillatory conversion to the third-harmonic frequency during propagation in the device. As a result, to design these devices for achieving highest conversion efficiency, a particular device length must be chosen that corresponds to the maximum of the conversion oscillation.

The optimal length of conventional devices is highly sensitive to the incident light intensity. Moreover, when there are undamped oscillatory conversion dynamics, ordinary laser beams with non-uniform spatial and temporal intensity profiles will experience low conversion efficiency. For example, when a device length coincides with the maximum of a conversion oscillation located at the peak of the beam profile or pulse profile, there will be good conversion only in the middle of the beam/pulse profile. Hence, the conversion efficiency suffers considerably.

In contrast, embodiments of THG 300 induce asymptotic, full convergence to the third-harmonic frequency output during propagation in the device due to its damped oscillatory behavior. As a result, one does not need to set the device to a specific length. Instead, one makes it as long as is possible given other factors (manufacturability, onset of perturbative and parasitic propagation effects) and therefore the design of our device has a wide tolerance for choice of length and the device has a wide tolerance with regards to incident light intensity when compared to other monolithic schemes. As another result, ordinary laser beams with non-uniform spatial and temporal intensity profiles can experience very high, almost full, conversion efficiency. Hence, a benefit of embodiments disclosed herein, which exhibit saturating (i.e., convergent) conversion to the third harmonic, is that spatiotemporally nonuniform fundamental beams can be completely converted to the third harmonic. In some embodiments, the fundamental optical beam has a wavelength (e.g. a center wavelength) in a range of 0.5-200 micrometers including any value therewithin and any subranges therebetween. In some embodiments, the third-harmonic optical beam has a wavelength in a range of 0.1-70 micrometers including any value therewithin and any subranges therebetween.

A crystal used for simultaneous SHG and SFG, such as optical element 200 of FIG. 2 would be designed to have a length approximately equal to where the peak of the fundamental laser beam is maximally depleted by conversion to the third harmonic, prior to the onset of back-conversion. In contrast, THG 300 does not exhibit back-conversion and may be designed such that its length 310 is as long as possible subject to manufacturing limitations or the onset of effects that disturb the conversion dynamics, such as temporal or spatial walk-off.

2.3.1 Phase-Matching

Perfect phase-matching of three processes, while theoretically possible using a biaxial crystal for propagation, poses a substantial challenge to recreate experimentally. As such, one may use quasi-phase matching (QPM) and choose a target function for said quasi-phase matching. In particular, in eq. (4) we define a new non-linearity as a function of propagation through a material:

$$d_{eff}(z) = d_{eff}(0)\cdot \mathrm{sgn}\left[\sum_{p=1}^{3}\alpha_p \sin(\Delta k_p z)\right] \quad (4)$$

Function $d_{eff}(z)$ is a poling function that specifies the value of the $\chi^{(2)}$ nonlinearity as a function of location z along a propagation direction through the material. This methodology provides relatively high fidelities for phase-matching multiple processes. THG 300 may be domain-poled according to poling function $d_{eff}(z)$ of eq. (4).

In eq. (4), $\Delta k_p$ is element p of a set of $\Delta k$ values corresponding to the three processes to be phase matched. In the case of FTHG, $\Delta k_1=\Delta k_{211}$, $\Delta k_2=\Delta k_{422}$, and $\Delta k_3=\Delta k_{431}$, which correspond to FTHG's three simultaneously occurring nonlinear processes and $\Delta k_{ijr}$ is introduced after eq. (1). Coefficient $\alpha_p$ is a weight given to each process and function sgn(·) is the signum function. The larger the value $\alpha_p$, the larger will be the value $\Gamma_p$ in eq. (2). For example, if one wanted to increase the value $\Gamma_{211}$, one would increase the value $\alpha_p$ corresponding to $\Delta k_p=\Delta k_{211}$. Coefficient $d_{eff}(0)$ is a parameter of the device medium that describes the magnitude of its nonlinear electric susceptibility tensor. In embodiments, coefficient $d_{eff}(0)$ equals $\chi^{(2)}/2$. This number is usually approximately the same for all three nonlinear frequency conversion processes and thus is treated as the same in this discussion.

We are motivated to simulate real materials in future sections. It is challenging to manufacture high-fidelity devices that follow the aforementioned methodology with precise domain shifts. As such, a tiling algorithm is used to generate manufacturable QPM gratings with material constraints. That is, we consult with a hypothetical manufacturer about minimum domain size and domain resolution of QPM gratings, and alter $d_{eff}(z)$ to these specifications, minimizing deviations to the target $d_{eff}(z)$.

We utilize $LiNbO_3$ and KTP aperiodically-poled materials, along with orientation-patterned GaAs, and the aforementioned tiling procedure to generate future figures.

2.4 Simulations

Figure 4:
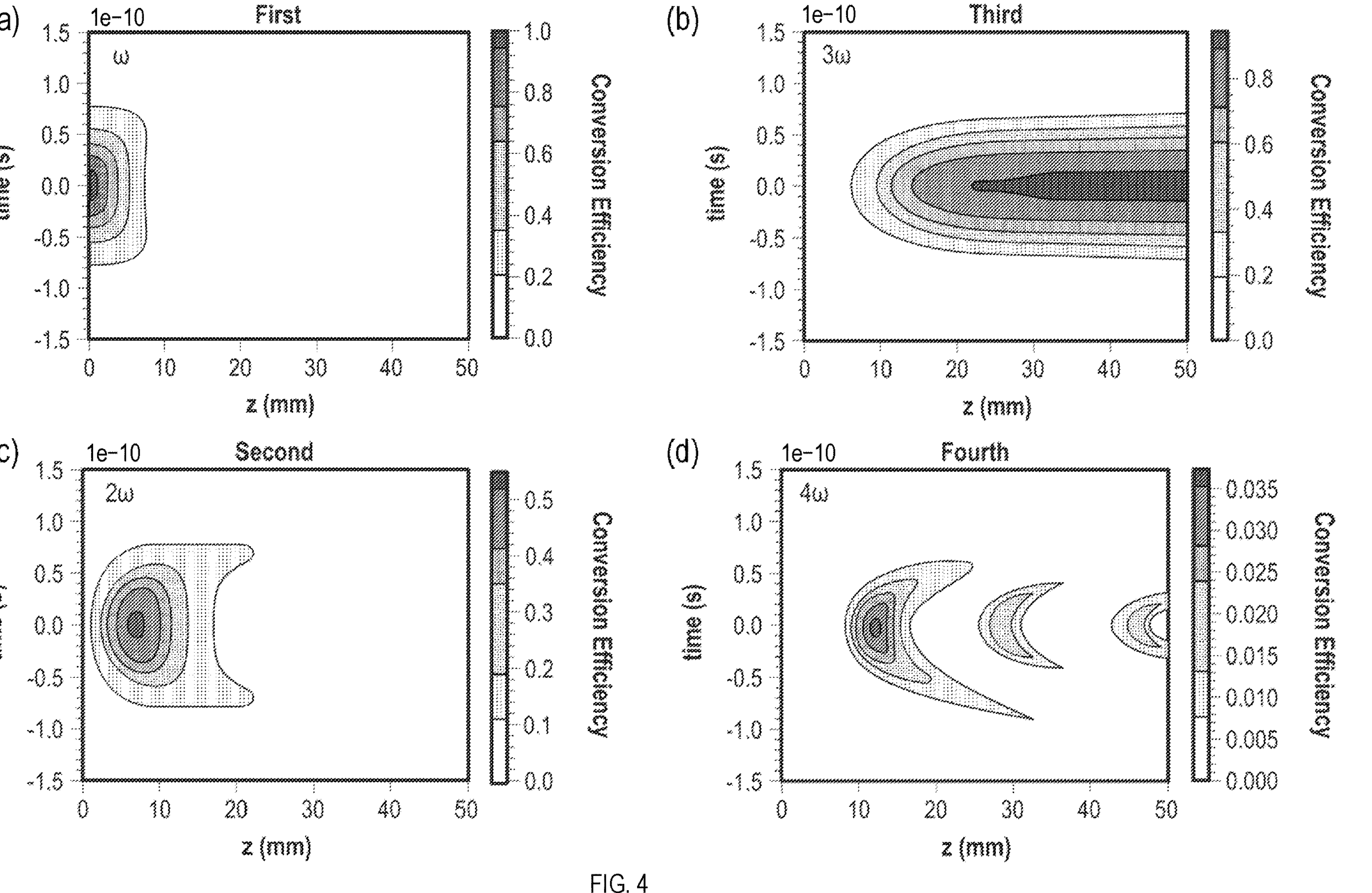
FIG. 4 depicts numerical pulse propagation simulations of the FTHG process in aperiodically poled $LiNbO_3$, in an embodiment.

FIG. 4 depicts numerical pulse propagation simulations of the FTHG process in an aperiodically poled $LiNbO_3$ device designed to convert a 2.06 μm wavelength fundamental harmonic to a 690 nm third harmonic. The device is an embodiment of THG 300. The input fundamental harmonic has an initial intensity of 0.25 $GW/cm^2$, and is 100-ps in duration. The phase matching is achieved using the multi-process QPM technique described above with amendments to the domain sizes and resolution to ensure manufacturability using the aforementioned tiling method. While the energy appears to oscillate asynchronously across the temporal extent of the first, second, and fourth harmonic pulses, the third harmonic grows asymptotically, acquiring the majority of the energy in the system.

To predict the total FTHG conversion efficiency possible in the $LiNbO_3$ device, we perform a spatiotemporal simulation of 1+2D Gaussian pulse and beam shapes. We find that the integrated conversion efficiency of the fundamental to the third harmonic asymptotically approaches 87% after 5 cm of propagation. Similarly, for a 5 cm aperiodically poled KTP device we find 82% conversion efficiency possible. For FTHG of 10-μm pulses to 3.33 μm, we find orientation patterned GaAs can accomplish the task with upwards of 81% conversion efficiency. Thus, the FTHG method provides a general approach for achieving THG with conversion efficiencies exceeding 80% in a monolithic device with a spatiotemporally non-uniform incident pulsed laser of 100-ps duration.

Figure 5:
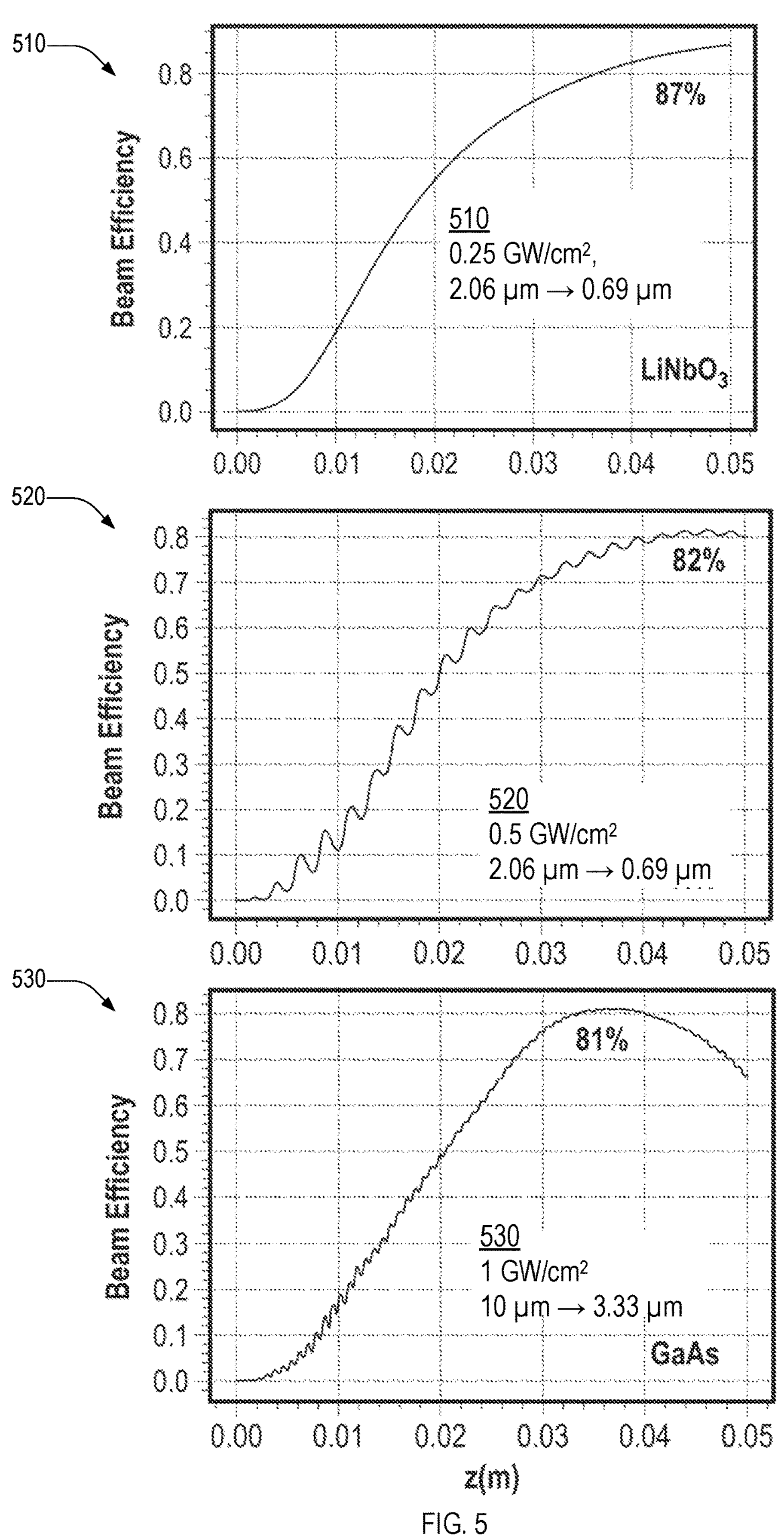
FIG. 5 illustrates total integrated fourth-to-third-harmonic energy conversion efficiency as a function of propagation distance for FTHG in different media, in embodiments.

FIG. 5 illustrates total integrated first-to-third-harmonic energy conversion efficiency as a function of propagation distance for FTHG in different embodiments of THG 300. Plots 510, 520, and 530 show energy conversion efficiency in aperiodically poled $LiNbO_3$, aperiodically poled KTP, and orientation patterned GaAs, respectively. In plots 510, 520, and 530, the respective wavelengths of the fundamental beams are 2.06-μm, 2.06-μm, and 10-μm. Each plot shows efficiencies exceeding 80%.

Figure 6:
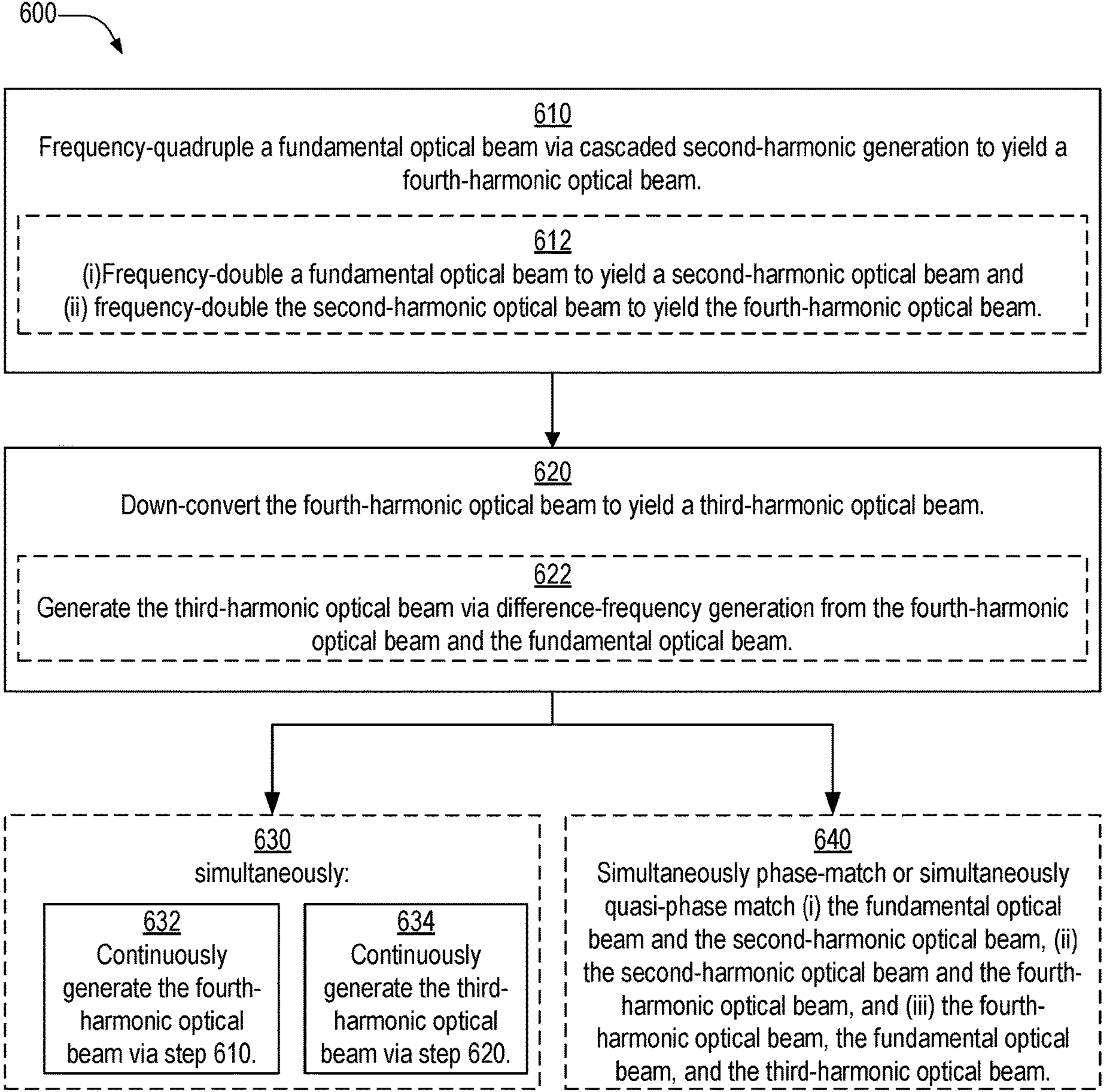
FIG. 6 is a flowchart illustrating a third-harmonic generation method, which may be implemented by the THG of FIG. 3, in an embodiment.

FIG. 6 is a flowchart illustrating a third-harmonic generation method 600, which may be implemented by THG 300. Method 600 includes at least one of steps 610, 620, 630, and 640.

Step 610 includes frequency-quadrupling a fundamental optical beam via cascaded second-harmonic generation to yield a fourth-harmonic optical beam. In an example of step 610, THG 300 frequency-quadruples fundamental optical beam 301 via cascaded second-harmonic generation to yield fourth-harmonic optical beam 304, as shown in FIG. 3(*a*). The second-harmonic generation of step 610 may include step 612, which includes: (i) frequency-doubling a fundamental optical beam to yield a second-harmonic optical beam and (ii) frequency-doubling the second-harmonic optical beam to yield the fourth-harmonic optical beam. In an example of step 612, THG 300 frequency-doubles fundamental optical beam 301 to yield second-harmonic optical beam 302 and frequency-doubles second-harmonic optical beam 302 to yield fourth-harmonic optical beam 304.

Step 620 includes down-converting the fourth-harmonic optical beam to yield a third-harmonic optical beam. In an example of step 620, THG 300 down-converting fourth-harmonic optical beam 304 to yield third-harmonic optical beam 303. Step 620 may include step 622, which includes generating the third-harmonic optical beam via difference-frequency generation from the fourth-harmonic optical beam and the fundamental optical beam. In an example of step 622, THG 300 generates third-harmonic optical beam 303 via difference-frequency generation from fourth-harmonic optical beam 304 and fundamental optical beam 301.

Step 630 includes simultaneous execution of steps 632 and 634. Step 632 includes continuously generating the fourth-harmonic optical beam via said step of frequency-quadrupling (step 610). In an example of step 632, THG 300 continuously generates fourth-harmonic optical beam 304 via step 610. Step 634 includes continuously generating the third-harmonic optical beam via said step of down-converting (step 620). In an example of step 634, THG 300 continuously generates third-harmonic optical beam 303 via step 620.

Step 640 includes simultaneously phase matching or quasi-phase matching (i) the fundamental optical beam and the second-harmonic optical beam, (ii) the second-harmonic optical beam and the fourth-harmonic optical beam, and (iii) the fourth-harmonic optical beam, the fundamental optical beam, and the third-harmonic optical beam. In an example of step 640, each of the following instances of phase matching occur simultaneously in THG 300: (i) phase matching or quasi-phase matching of fundamental optical beam 301 and second-harmonic optical beam 302, (ii) phase matching or quasi-phase matching of second-harmonic optical beam 302 and fourth-harmonic optical beam 304, and (iii) phase matching or quasi-phase matching of fourth-harmonic optical beam 304, fundamental optical beam 301, and third-harmonic optical beam 303.

APPENDIX

Define characteristic wave-mixing equations for FTHG:

$$\begin{cases} \frac{\partial A_1}{\partial z} = i\kappa_1\left(A_2A_1^*e^{i\Delta k_{211}z} + A_3A_2^*e^{i\Delta k_{321}z} + A_4A_3^*e^{i\Delta k_{431}z}\right) \\ \frac{\partial A_2}{\partial z} = i\kappa_2\left(\frac{1}{2}A_1^2e^{-i\Delta k_{211}z} + A_3A_1^*e^{i\Delta k_{321}z} + A_4A_2^*e^{i\Delta k_{422}z}\right) \\ \frac{\partial A_3}{\partial z} = i\kappa_3\left(A_2A_1e^{-i\Delta k_{321}z} + A_4A_1^*e^{i\Delta k_{431}z}\right) \\ \frac{\partial A_4}{\partial z} = i\kappa_4\left(\frac{1}{2}A_2^2e^{-i\Delta k_{422}z} + A_3A_1e^{-i\Delta k_{431}z}\right) \end{cases} \tag{A1}$$

With $\Delta k_{211}=k_2-2k_1$, $\Delta k_{321}=k_3-k_2-k_1$, $\Delta k_{422}=k_4-2k_2$, and $\Delta k_{431}=k_4-k_3-k_1$, and only the fundamental initially seeded. Take all of these quantities to be 0. A new amplitude $U_i$ is defined such that $$A_k = U_k\sqrt{\frac{\hbar\omega_kF_0}{2n_k\epsilon_0}}$$

with $F_0$ being the initial photon flux, and $|U_k|^2=\eta_k$ (fractional photon number of the given amplitude). Corresponding values are defined:

$$\Gamma_{211} = \frac{d_{eff211}}{2c^{3/2}}\sqrt{\frac{\hbar\omega_1^2\omega_2F_0}{2n_1^2n_2\epsilon_0}},\ \Gamma_{321} = \frac{d_{eff321}}{c^{3/2}}\sqrt{\frac{\hbar\omega_1\omega_2\omega_3F_0}{2n_1n_2n_3\epsilon_0}},$$

$$\Gamma_{422} = \frac{d_{eff422}}{2c^{3/2}}\sqrt{\frac{\hbar\omega_2^2\omega_4F_0}{2n_2^2n_4\epsilon_0}},\ \Gamma_{431} = \frac{d_{eff431}}{c^{3/2}}\sqrt{\frac{\hbar\omega_1\omega_3\omega_4F_0}{2n_1n_3n_4\epsilon_0}}$$

Fundamental relations for the frequencies can be drawn:

$$\omega_2 = 2\omega_1,\ \omega_3 = 3\omega_1,\ \omega_4 = 4\omega_1$$

Leading to new gamma values:

$$\Gamma_{211} = \frac{d_{eff211}}{2c^{3/2}}\sqrt{\frac{\hbar\omega_1^3F_0}{n_1^2n_2\epsilon_0}},\ \Gamma_{321} = \frac{d_{eff321}}{c^{3/2}}\sqrt{\frac{3\hbar\omega_1^3F_0}{n_1n_2n_3\epsilon_0}},$$

$$\Gamma_{422} = \frac{d_{eff422}}{2c^{3/2}}\sqrt{\frac{8\hbar\omega_1^3F_0}{n_2^2n_4\epsilon_0}},\ \Gamma_{431} = \frac{d_{eff431}}{c^{3/2}}\sqrt{\frac{6\hbar\omega_1^3F_0}{n_1n_3n_4\epsilon_0}}$$

Of interest is the distinct case of $\Gamma_{321}=0$, where the $\omega+2\omega=3\omega$ process is ignored. New equations with eq. (A1) as the basis can then be defined for aforementioned conditions:

$$\begin{cases} \frac{dU_1}{dz} = i(2\Gamma_{211}U_2U_1^* + \Gamma_{431}U_4U_3^*) \\ \frac{dU_2}{dz} = i\left(\Gamma_{211}U_1^2 + 2\Gamma_{422}U_4U_2^*\right) \\ \frac{dU_3}{dz} = i(\Gamma_{431}U_4U_1^*) \\ \frac{dU_4}{dz} = i\left(\Gamma_{422}U_2^2 + \Gamma_{431}U_3U_1\right) \end{cases}$$

Define a variable $\zeta$ with the equivalence: $\zeta=\Gamma_{211}z$, and new values $$\Gamma_0 = \frac{\Gamma_{431}}{\Gamma_{211}},\ \Gamma_1 = \frac{\Gamma_{422}}{\Gamma_{211}}.$$

A third set of equations can be constructed:

$$\begin{cases} \frac{dU_1}{d\zeta} = i(2U_2U_1^* + \Gamma_0U_4U_3^*) \\ \frac{dU_2}{d\zeta} = i\left(U_1^2 + 2\Gamma_1U_4U_2^*\right) \\ \frac{dU_3}{d\zeta} = i(\Gamma_0U_4U_1^*) \\ \frac{dU_4}{d\zeta} = i\left(\Gamma_1U_2^2 + \Gamma_0U_3U_1\right) \end{cases} \tag{A2}$$

One can solve for the third harmonic amplitude using eq. (A2):

$$\frac{d^2U_3}{d\zeta^2} = \frac{d}{d\zeta}(i(\Gamma_0U_4U_1^*)) = i\Gamma_0\left(\frac{d}{d\zeta}(U_4)U_1^* + U_4\frac{d}{dz}(U_1^*)\right) \Rightarrow$$

$$i\Gamma_0\left(\left(i\left(\Gamma_1U_2^2 + \Gamma_0U_3U_1\right)\right)U_1^* + U_4(-i(2U_2^*U_1 + \Gamma_0U_4^*U_3))\right) =$$

$$-\Gamma_0\Gamma_1U_1^*U_2^2 - \Gamma_0^2U_3\eta_1 + 2\Gamma_0U_4U_2^*U_1 + \Gamma_0^2U_3\eta_4$$

Where $\eta_k=|U_k|^2$ (fractional photon number of the given amplitude). Thus;

$$\Rightarrow -\Gamma_0^2(\eta_1 - \eta_4)U_3 + \left(2\Gamma_0U_4U_2^*U_1 - \Gamma_0\Gamma_1U_1^*U_2^2\right)$$

Using eq.

$$U_1^* = -i\frac{U_3'}{\Gamma_0 U_4}, \text{ and } U_1 = i\frac{U_3'^*}{\Gamma_0 U_4^*}\left(\text{where } U_3' = \frac{dU_3}{d\zeta}\right). \tag{A2}$$

Since $U_3$ is always real, the relation $$U_3'^* = U_3'$$

holds. Then, $$\Rightarrow -\Gamma_0^2(\eta_1 - \eta_4)U_3 + i\left(2\Gamma_0\frac{U_4}{U_4^*}U_2^*U_3' - \Gamma_0\Gamma_1\frac{U_2^2}{U_4}U_3'\right)$$

It is important to recognize that $$\frac{U_4}{U_4^*} = -1,$$

since $U_4$ is always pure imaginary. Next:

$$\Rightarrow -\Gamma_0^2(\eta_1 - \eta_4)U_3 - i\left(2\Gamma_0 U_2^* + \Gamma_0\Gamma_1\frac{U_2^2}{U_4}\right)U_3'$$

At this time, one must consult the Manley-Rowe equations to simplify the ODE:

$$\eta_1 + 2\eta_2 + 3\eta_3 + 4\eta_4 = 1 = \eta_{1initial}$$

Thus:

$$= -\Gamma_0^2(1 - 2\eta_2 - 3\eta_3 - 5\eta_4)U_3 - i\left(2\Gamma_0 U_2^* + \Gamma_0\Gamma_1\frac{U_2^2}{U_4}\right)U_3' = -\Gamma_0^2(1 - 2\eta_2 - 5\eta_4)U_3 - i\left(2\Gamma_0 U_2^* + \Gamma_0\Gamma_1\frac{U_2^2}{U_4}\right)U_3' + 3\Gamma_0^2 U_3^3$$

We can make the additional substitution of $$\Lambda = \zeta\Gamma_0^2$$

to simplify further:

$$\frac{d^2U_3}{d\Lambda^2} = -(1 - 2\eta_2 - 5\eta_4)U_3 - i\left(\frac{2U_2^*}{\Gamma_0} + \frac{\Gamma_1}{\Gamma_0}\frac{U_2^2}{U_4}\right)U_3' - 3U_3^3$$

One should note that $U_2$ and $$U_2^*$$

are both pure imaginary; i.e, multiplying them by i gives a real result. Additionally $$\frac{U_2}{U_4}$$

is always real since both quantities are pure imaginary. It follows then, that every term associated with $$U_3'$$

is a pure, real, scalar. It's easy to tell at a glance the aforementioned equation's similarities with the characteristic equation for a duffing oscillator:

$$\frac{d^2x}{dt^2} = -kx - \gamma\frac{dx}{dt} + \beta x^3$$

with the equivalent substitutions, $$\begin{cases} x = U_3 \\ t = \Lambda = \zeta\Gamma_0^2 \\ k = 1 - 2\eta_2 - 5\eta_4 \\ \gamma = i\left(\frac{2U_2^*}{\Gamma_0} + \frac{\Gamma_1}{\Gamma_0}\frac{U_2^2}{U_4}\right) \\ \beta = 3 \end{cases}$$

And for the sake of curiosity, we seek the dependence of γ (the damping coefficient) on mutable variables:

$$\gamma = i\left(\frac{2U_2^*}{\Gamma_0} + \frac{\Gamma_1}{\Gamma_0}\frac{U_2^2}{U_4}\right)$$

$$\Gamma_0 = \frac{\Gamma_{431}}{\Gamma_{211}} = 2\sqrt{6}\frac{d_{431}}{d_{211}}\sqrt{\frac{n_1 n_2}{n_3 n_4}}$$

$$\Gamma_1 = \frac{\Gamma_{422}}{\Gamma_{211}} = 2\sqrt{2}\frac{d_{422}}{d_{211}}\sqrt{\frac{n_1^2}{n_2 n_4}}$$

Leading to a damping ratio of:

$$i\frac{\sqrt{3}}{3}\left(\frac{\sqrt{2}\,d_{211}U_2^*}{2d_{431}}\sqrt{\frac{n_3 n_4}{n_1 n_2}} + \frac{d_{422}U_2^2}{d_{431}u_4}\sqrt{\frac{n_1 n_3}{n_2^2}}\right)$$

$U_2$ is always a positive, pure imaginary number, meaning that the first term is a negative pure imaginary number times i (a positive scalar). $(U_2)^2=-\eta_2$, and $U_4$ is always a negative, pure imaginary number, meaning that the second term above is also a negative pure imaginary number times i. Let us make the substitutions $$\delta_1 = i\frac{\sqrt{6}}{6}U_2^*, \text{ and } \delta_2 = -i\frac{\sqrt{3}\,\eta_2}{3U_4}.$$

We can then write a new damping coefficient:

$$\gamma=\left(\delta_1\frac{d_{211}}{d_{431}}\sqrt{\frac{n_3n_4}{n_1n_2}}+\delta_2\frac{d_{422}}{d_{431}}\sqrt{\frac{n_1n_3}{n_2^2}}\right).$$

where $\delta_1, \delta_2, \gamma\in\mathbb{R}^+$.

We claim:

1. A third-harmonic generation method, comprising:

frequency-quadrupling a fundamental optical beam via cascaded second-harmonic generation to yield a fourth-harmonic optical beam; and down-converting the fourth-harmonic optical beam to yield a third-harmonic optical beam.

2. The method of claim 1, said frequency-quadrupling the fundamental optical beam and down-converting the fourth-harmonic optical beam occurring in a same non-linear medium.

3. The method of claim 1, further comprising:

continuously generating the fourth-harmonic optical beam via said step of frequency-quadrupling; and, simultaneously, continuously generating the third-harmonic optical beam via said step of down-converting.

4. The method of claim 1, said down-converting comprising generating the third-harmonic optical beam via difference-frequency generation from the fourth-harmonic optical beam and the fundamental optical beam.

5. The method of claim 1, in said frequency-quadrupling, the cascaded second-harmonic generation comprising (i) frequency-doubling the fundamental optical beam to yield a second-harmonic optical beam and (ii) frequency-doubling the second-harmonic optical beam to yield the fourth-harmonic optical beam, and further comprising:

simultaneously phase-matching or simultaneously quasi-phase matching (i) the fundamental optical beam and the second-harmonic optical beam, (ii) the second-harmonic optical beam and the fourth-harmonic optical beam, and (iii) the fourth-harmonic optical beam, the fundamental optical beam, and the third-harmonic optical beam.

6. A third-harmonic generator comprising:

a monolithic optical element having nonzero quadratic electric susceptibility to (i) frequency-quadruple a fundamental optical beam via cascaded second-harmonic generation to yield a fourth-harmonic optical beam, and (ii) down-convert the fourth-harmonic optical beam to yield a third-harmonic optical beam.

7. The third-harmonic generator of claim 6, the monolithic optical element being domain-poled according to a polling function $d_{eff}(z)=d_{eff}(0)\cdot\mathrm{sgn}$ $$\left[\sum_{p=1}^{3}\alpha_p\sin(\Delta k_p z)\right]$$

where $\Delta k_1=\Delta k_{211}$, $\Delta k_2=\Delta k_{422}$, and $\Delta k_3=\Delta k_{431}$ and $\Delta k_{ijr}=k_i-k_j-k_r$, where k is the wavenumber in the monolithic optical element.

8. The third-harmonic generator of claim 6, wherein the monolithic optical element satisfies a condition for either simultaneous phase matching or simultaneous quasi-phase matching of (i) the fundamental optical beam and the second-harmonic optical beam, (ii) the second-harmonic optical beam and the fourth-harmonic optical beam, and (iii) the fourth-harmonic optical beam, the fundamental optical beam, and the third-harmonic optical beam.

9. The third-harmonic generator of claim 8, phase matching or quasi-phase matching of the fourth-harmonic optical beam and the fundamental optical beam resulting in generation of the third-harmonic optical beam;

the monolithic optical element having a length, in a propagation direction of the third-harmonic optical beam within the monolithic optical element, such that optical power of the third-harmonic optical beam reaches a steady state within the monolithic optical element.

10. The third-harmonic generator of claim 6, the monolithic optical element being aperiodically poled.

11. The third-harmonic generator of claim 6, the monolithic optical element being quasi-periodically poled.

12. The third-harmonic generator of claim 6, the monolithic optical element having a material composition that includes gallium arsenide.

13. The third-harmonic generator of claim 6, the monolithic optical element having a material composition that includes potassium titanyl phosphate (KTP).

14. The third-harmonic generator of claim 6, the monolithic optical element having a material composition that includes lithium niobate.

15. The third-harmonic generator of claim 6, said frequency-quadrupling producing the fourth-harmonic optical beam.

16. The third-harmonic generator of claim 6, the monolithic optical element being a waveguide.

17. The third-harmonic generator of claim 6, further comprising a substrate, the monolithic optical element being a film on at least part of the substrate.

18. The third-harmonic generator of claim 17, a thickness of the film being between 0.1 micrometers and two micrometers.

19. The third-harmonic generator of claim 17, the film having a material composition that includes lithium niobate.

20. The third-harmonic generator of claim 6, a center wavelength of the fundamental optical beam being between 0.2 micrometers and 200 micrometers.

* * * * *